June 21, 1927.
E. KREISSIG
1,633,027
SPRING SUPPORTING MEANS AND THE LIKE
Filed Feb. 27, 1926   2 Sheets-Sheet 1
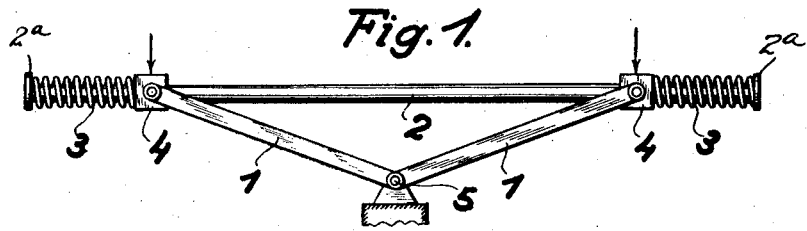
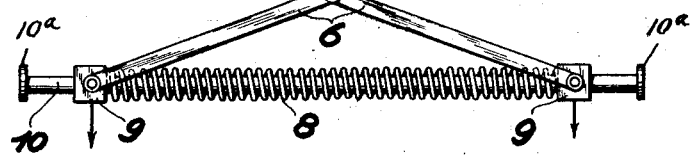
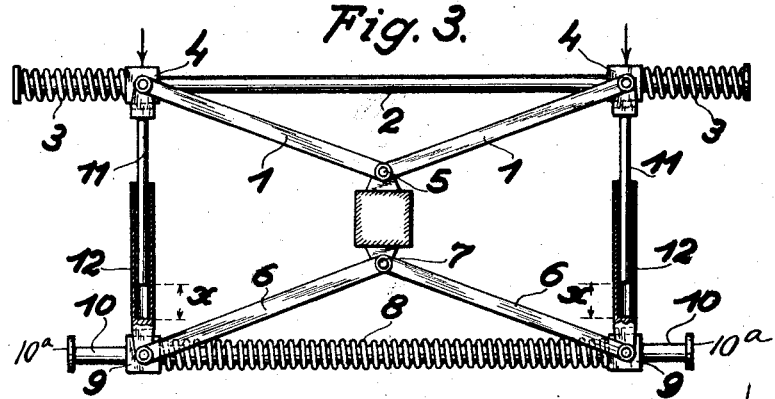
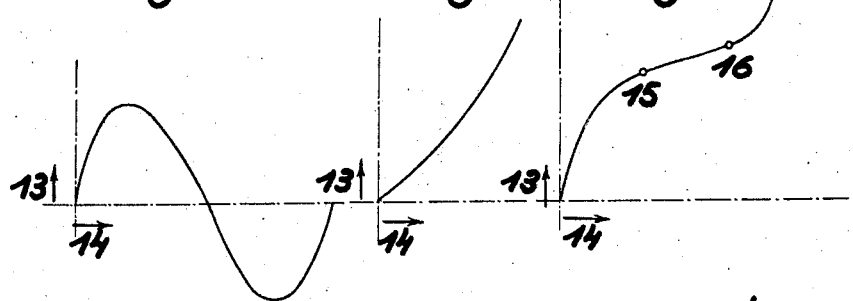
Inventor
Ernst Kreissig
by his attorney June 21, 1927.
E. KREISSIG
1,633,027
SPRING SUPPORTING MEANS AND THE LIKE
Filed Feb. 27, 1926     2 Sheets-Sheet 2
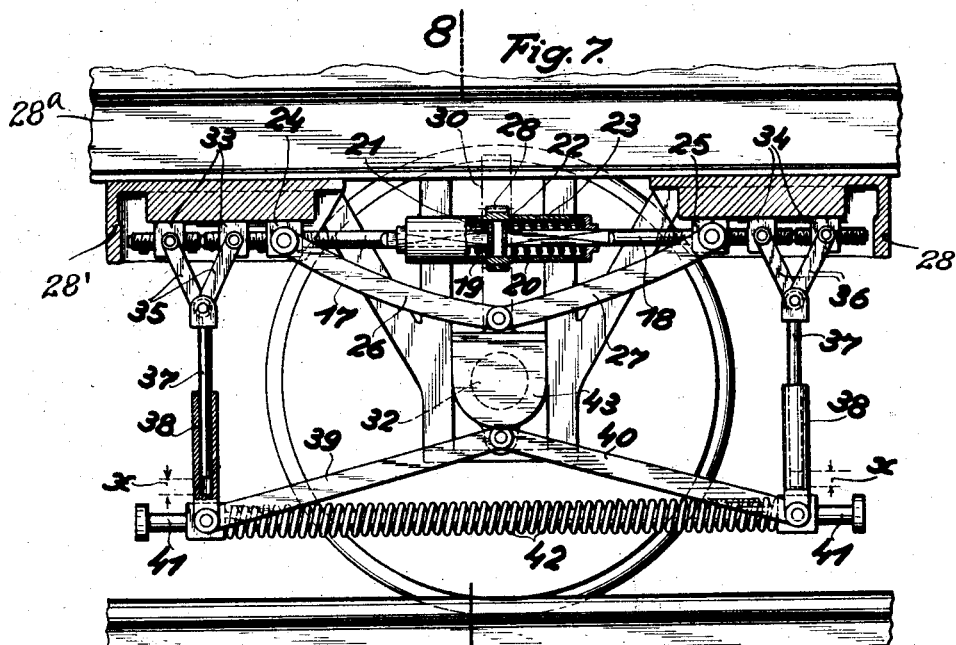
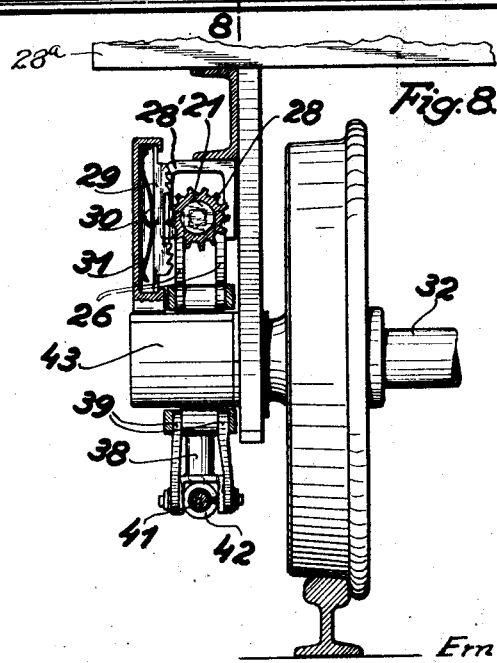
Inventor
Ernst Kreissig
by his attorney Patented June 21, 1927.

1,633,027

UNITED STATES PATENT OFFICE.

ERNST KREISSIG, OF UERDINGEN, GERMANY.

SPRING-SUPPORTING MEANS AND THE LIKE.

Application filed February 27, 1926, Serial No. 91,075, and in Germany September 24, 1924.

This invention has reference to spring-supporting means which are particularly adaptable for rail-road vehicles, motor vehicles and the like and the essential elements of which comprise a combination of spring-acting struts, props, or frame supports or the like, all or part of which elements are spring-actingly arranged. The particular novelty of this invention, among other important features, is based on the fact that the several springs are connected to each other in such a manner that when the load is operating thereon, the stress is working on one of the springs only in the beginning, while with an increase of the load or of the thrusts the totality of the springs will be caused to operate in common. In accordance with one of the preferred forms of construction of the invention, the varying of stress on the springs is caused to produce an automatic variation of the effective length of some or all of the struts or the like or of those parts thereof which are adapted to control and regulate the distance of the successively actuating springs. By this means the spring force is made to adjust itself automatically in accordance with the varying load on the parts of the vehicle. In pursuance thereof, it is one of the important objects of the invention to devise means of producing a spring-action which is as free as possible from oscillations or having a minimum of natural oscillations.

The invention will be further described and set forth with reference to the accompanying drawings showing by way of exemplification several forms of construction embodying the principles of this invention.

In Figs. 1 and 2 some otherwise known arrangements of springs are shown which are employed in connection with my invention; Fig. 3 is a modification of the principles shown in Figs. 1 and 2; Figs. 4, 5 and 6 are diagrammatic representations of the graphs corresponding to the springs in Figs. 1, 2 and 3, respectively; Figs. 7 and 8 show a modified form of construction of the novel spring-acting support, respectively in side view with parts in section and in vertical cross section on the line 8—8.

In Fig. 1, I have shown a system of spring-acting supporting struts comprising the two inclined struts or toggle-levers 1 and an intermediate or central strut 2 connecting the same. The struts are or may be made of metal or other suitable resilient material, and are employed in association with springs 3 for cushioning actions. As shown, the strut 2 is provided with end heads or shoulders $2^a$, and the springs 3 are fitted upon this strut and bear at their outer ends against the said heads or shoulders $2^a$. Sleeves 4 are slidably mounted on the strut 2, for movements toward and from each other, and bear at their outer sides against the inner ends of the springs 3. The two inclined struts or toggle levers 1 are pivotally connected at their inner ends to a part 5, which may be a rigid point of support. When the load strain falls upon this strut structure in the direction of the arrow shown in Figure 1, the strut 2 is forced downwardly and the struts 1 swing outwardly and downwardly against the resistance to compression of the spring 3 opposing outward sliding movement of the sleeves 4. When the pressure of the load is diminished or entirely relieved from the device, a reverse movement of the parts will take place in a manner readily understood.

Fig. 2 illustrates a reverse arrangement of the spring support of Fig. 1, in which the inclined supporting struts or toggle-levers 6 are downwardly directed from the rigid point 7, a spring 8 being fitted on the central strut 10 and inserted between the sleeves 9 which are slidably mounted on the central strut 10. The direction of the stress of the load is the same as in Fig. 1. The stops $10^a$ on strut 10 here limit the outward movement of sleeves 9.

In Fig. 3 I have shown a combination of the two spring systems of Figs. 1 and 2 into a new arrangement of springs in accordance with this invention. The numerals 1–10 correspond to the numerals employed for the identical parts in Figs. 1 and 2. The sleeves 4, 9 on the struts 2, 10 are here pivotally connected by the telescopingly engaging rods and tubular members 11, 12 in such a manner that the lower spring will only be strained to the extent of the distance $x$ of the link connection, after the stress has operated upon the upper springs 3.

Figs. 4–6 show graphs of the spring arrangements according to Figs. 1–3 in which the path of the straining force is indicated by the arrow 13, while the arrow 14 indicates the spring-action. As appears from the diagram in Fig. 6, the curve shows a steep ascent up to the point 15, and then continues flat up to the point 16, whereupon it again proceeds under a steep ascent. The interval of spring action between the points 15 and 16 is particularly advantageous for producing the spring-support of vehicles, on account of the comparatively low ascent between these points, and the system of springs employed should have its spring forces adjusted in such a manner that the spring force corresponding to the load will be made to act between the points 15 and 16. In accordance with the distance $x$ in Fig. 3, a displacement of the individual spring diagrams of the springs relatively to each other is effected by the summation of which a diagram may be obtained in accordance with the graph shown in Fig. 6 and in the desired form.

Inasmuch as the majority of all vehicles is arranged for the conveying of loads, the springs are differently strained in accordance with the loading of the vehicle. The system illustrated in Fig. 3, however, corresponds to a single curve of the spring force only which corresponds to a certain definite load. This is not sufficient for transportation vehicles generally, inasmuch as spring supports available for such purposes must be able to adapt themselves automatically to the variations of the load. This object is preferably accomplished in the system hereinbefore referred to by providing means of varying the supporting capacity of the system by the automatic or manual adjustment of the length of all or certain of the struts of the system. In view, however, of the fact that in consequence thereof the spring diagram may be changed, it becomes necessary to also automatically adjust the distance $x$ to the required amount. A form of construction embodying these principles of my invention by way of exemplification is shown in Figs. 7 and 8. In this figure the upper intermediate strut is shown to consist of two rods or bars 17, 18 the confrontingly opposite ends of which are caused to bear by means of the springs 19 and 20, respectively, against the opposite faces 21 and 22 of a block or abutment.

The springs are enclosed in a tube 23 and displaceably mounted on the rods 17, 18, and secured against rotation with relation thereto, so that the rods 17, 18 and the tube 23 with supporting means for the springs constitute a strut member secured against its own rotation. At their ends the rods 17, 18 are screw-threaded, the rod 17 being provided, for instance, with left-handed screw-threads and the rod 18 having a right-handed screw-thread, and upon these threads nuts 24, 25 are displaceably disposed to which the inclined struts or toggle-levers 26, 27 are linked. Upon the tube 23 a ratchet wheel 28 is mounted against which a rack bar 29 with two rows of teeth separated by an interrupting gap is caused to bear which is mounted in a casing 30 secured to the journalling box of the shaft 32 and adapted to be forced in contact with the ratchet wheel 28 by a spring 31. The parts 29, 30, 31 and the shaft 32 are not affected by the spring action. Upon the rods 17, 18 additional nuts 33, 34 having respectively right-handed and left-handed screw-threads are disposed to which links 35, 36 are attached which couple said nuts 33, 34 to the telescoping rods 37, 38. To the telescoping members 38 the inclined struts or toggle-levers 39, 40 are pivotally connected and on the intermediate or central strut 41 the lower spring 42 is mounted. As shown, the threaded ends of rods 17, 18 are received in guide brackets 28' in which the nuts 24, 25, 33, 34 are slidably mounted, said brackets being fixed upon the vehicle body or other load support 28$^a$. Now, if the system is submitted to spring-acting stress the ratchet wheel 28 will also be subject to the spring action, either upwards or downwards beyond the points 15, 16 shown in the spring diagram of Fig. 6, and this will cause either the upper or the lower teeth of the rack bar 29 to become engaged with the ratchet wheel 28 which is thereby rotated in one or the other direction. This will cause the nuts 24, 25 to be displaced so as to increase or diminish the supporting capacity of the system. In consequence of the rotation of the rods 17, 18 the nuts 33, 34 will be respectively approached or moved away from each other, causing the rods 37 to be downwardly or respectively upwardly displaced, so as to regulate and adjust the distance $x$ in the desired manner.

It should, of course, be understood that the same action may be produced by other suitable constructive arrangements embodying the essential important feature of the automatic regulation of the relative proportionate length of different struts and the like or the simultaneous adjustment of the value $x$ of the displacement of the spring diagram, these and other modified arrangements of parts and of construction thereof being admissible within the scope and spirit of my invention as particularly set forth in the appended claims.

I claim:—

1. In a spring support for vehicle parts and the like, a system of spring-actuating struts comprising a plurality of relatively movable struts, and means operatively connected to said struts so as to cause certain of the struts to be subject to loading stress ahead of the imposition of the load strain upon the entire system of struts.

2. In a spring support for vehicle parts and the like under load, a system of relatively movable spring-actuating struts, and means operatively associated therewith and adapted to cause less than the whole number of struts to be subject to loading stress during a certain period ahead of the straining of the entire system of struts, and adjusting means for the last-mentioned means.

3. In a spring support for vehicle parts and the like under load, two series of spring-actuating struts spaced from each other, connecting means of adjustable length between the two series and adapted to cause one of said series to be influenced by the loading stress ahead of the straining of the entire combination of struts in consequence of the load.

4. In a spring-support for vehicle parts and the like under load, two series of spring-actuating struts spaced from each other, telescopingly engageable connecting means of adjustable length between the two series, means to adjust the travel of said connecting means with relation to each other, so as to cause one of the series of struts to be influenced by the loading stress ahead of the influencing of the entire combination of the two series of struts.

5. In a spring support for vehicle parts and the like, two series of spring-actuating struts spaced from each other, telescopingly engageable connecting means pivotally secured to the two series, means operatively connected to said telescoping means and disposed on one of the series of struts and displaceable thereon, a casing and actuating means on said casing engageable with the displaceable means and adapted to regulate the displacement thereof and the movement of the telescoping means in accordance with the spring action.

6. In a spring support for vehicle parts and the like, a first series of spring-actuating struts comprising two spring-actuating rods in axial alinement with each other, connecting links displaceably mounted on the rods, a second series of spring-actuating struts spaced from the first series, telescopingly engageable connecting means pivotally secured to opposite ends of the two series, means operatively connected to said telescoping means and displaceably and unrotatably disposed on the first series of struts, a casing, an interrupted series of rack teeth on said casing engageable with the displaceably mounted connecting links and adapted to produce the displacement of the telescoping means, and an operating shaft on said casing.

In testimony whereof I affix my signature.

ERNST KREISSIG.